(12) United States Patent
Zhang

(10) Patent No.: US 8,485,677 B2
(45) Date of Patent: Jul. 16, 2013

(54) BACKLIGHT MODULE AND LAMP INSTALLATION DEVICE THEREOF

(75) Inventor: Tian Zhang, Shenzhen (CN)

(73) Assignee: Shenzhen China Star, Shenzhen (CN)

( * ) Notice: Subject to any disclaimer, the term of this patent is extended or adjusted under 35 U.S.C. 154(b) by 339 days.

(21) Appl. No.: 12/991,706

(22) PCT Filed: Aug. 18, 2010

(86) PCT No.: PCT/CN2010/076091
§ 371 (c)(1),
(2), (4) Date: Nov. 9, 2010

(87) PCT Pub. No.: WO2011/156988
PCT Pub. Date: Dec. 22, 2011

(65) Prior Publication Data
US 2012/0182717 A1    Jul. 19, 2012

(30) Foreign Application Priority Data

Jun. 17, 2010 (CN) .......................... 2010 1 0206854

(51) Int. Cl.
*G09F 13/04* (2006.01)
(52) U.S. Cl.
USPC ........................................ 362/97.1; 362/97.2
(58) Field of Classification Search
USPC .............................................. 362/97.1–97.2
See application file for complete search history.

(56) References Cited

U.S. PATENT DOCUMENTS

2007/0183149 A1*  8/2007  Ko et al. ........................ 362/225
2010/0103647 A1*  4/2010  Liao et al. ..................... 362/97.1

FOREIGN PATENT DOCUMENTS

| CN | 101329046 A  | 12/2008 |
| CN | 101368697 A  | 2/2009 |
| CN | 201318630 Y  | 9/2009 |
| JP | 2007172845 A | 7/2007 |
| JP | 2008251535 A | 10/2008 |
| WO | 2009113205 A1| 9/2009 |

* cited by examiner

*Primary Examiner* — Sean Gramling
(74) *Attorney, Agent, or Firm* — Ditthavong, Mori & Steiner, P.C.

(57) ABSTRACT

The present invention provides a backlight module and a lamp installation device thereof. The backlight module comprises a plurality of lamps therein, and two ends of each of the lamps are clamped, positioned and electrically connected to one of the lamp installation devices, respectively. Each of the lamp installation devices comprises: a mounting end, a lamp clamping portion and an elastic conductive plate. The mounting end is used to mount the lamp installation device on the backlight module; the lamp clamping portion has a pair of elastic clamping plates for engaging with one end of the lamp; and the elastic conductive plate is electrically connected to a terminal of the end of the lamp. The manufacture cost of the lamp installation device of the present invention is relatively low and the installation thereof is simple, while the lamp also can provide a better impact resistance.

15 Claims, 4 Drawing Sheets

BACKLIGHT MODULE AND LAMP INSTALLATION DEVICE THEREOF

FIELD OF THE INVENTION

The present invention relates to a backlight module and a lamp installation device thereof, and more particularly to a lamp installation device for simultaneously clamping, positioning and electrically connecting to a lamp terminal and to a backlight module having the device.

BACKGROUND OF THE INVENTION

Nowadays, liquid crystal display (LCD) panels are widely applied to various electronic products with growth potential, such as monitors, notebook computers, digital cameras and projectors. After manufacturers of LCD panels fabricate glass substrates, a color filter is firstly combined with the glass substrates, then liquid crystals are filled into the sealed glass substrates and color filter, and further combined with various components, including a backlight module, driver ICs, controller PCBs and etc., to commonly construct a LCD module for selling to downstream manufacturers of notebook computers or LCD monitors.

The backlight module is one of key components of LCD panels. Because the liquid crystals can not emit light by itself, the function of the backlight module is to provide evenly distributed light sources with sufficient brightness for normally showing images. The backlight module comprises various components, such as light sources, a lamp shade, a reflector plate, a light guide plate, a diffusion sheet, a brightness enhancement film and an outer frame.

Generally, the backlight module can be divided into two types, i.e. front light type and back light type. According to scale requirement of the back light type, lamp positions thereof can be divided and developed into edge lighting type structure and bottom lighting type structure, wherein light emitting sources of the edge lighting type structure are a single light source mounted on one side position, and the light emitting sources of the bottom lighting type structure are mounted on a bottom position. The light sources of the bottom lighting type structure are preferably lamps, light emitting diodes (LEDs) and etc.

The lamps of the backlight module must have properties including high brightness and long lifetime, and can be cold cathode fluorescent lamps (CCFL), hot cathode fluorescent lamps (HCFL), light emitting diodes (LED), electro-luminescent sheets (EL) and etc., wherein the CCFL lamps has properties including high luminance, high efficiency, long lifetime, high color rendering index and etc., while it has a column-shape profile. Thus, it can be easily installed with a light reflecting element to construct a thin plate illumination device, so that the CCFL lamps are still the mainstream design now.

Furthermore, the clamping and conducting devices for the lamps are essential components of backlight modules using the lamps as back light sources. Presently, traditional clamping and conducting devices include the following types:

(1) a lamp is sandwiched between two metal plates, and then a third component is used to tightly clamp the lamp, so as to carry out the installation and the electrical conduction. This type of device has disadvantages including too many fabricated components and too low impact resistance;

(2) a lead wire of an end of a lamp is additionally provided with a metal cap, and then an elastic metal plate is used to tightly clamp the metal cap, so as to carry out the installation and the electrical conduction. This type of device has disadvantages including too many fabricated components and too high manufacture cost of the metal cap; or (3) an end of a lamp is provided with a soft rubber pad, and a lead wire is wound and passed through a through hole of the soft rubber pad for being welded with the lamp. This type of device has disadvantages including too complicated installation and too inconvenient detachment.

As described above, the traditional clamping and conducting devices have disadvantages including too complicated installation steps, too low impact resistance, too many and too complicated components and too high manufacture cost.

As a result, it is necessary to provide a backlight module and a lamp installation device thereof to solve the foregoing problems of the traditional technology.

SUMMARY OF THE INVENTION

To solve the foregoing technical problems, the present invention is to provide a backlight module and a lamp installation device thereof.

The present invention is to provide a lamp installation device, which is applied to an end of a lamp in a backlight module of a liquid crystal display (LCD), wherein the lamp installation device comprises: a mounting end, a lamp clamping portion and an elastic conductive plate. The mounting end is used to mount the lamp installation device on the backlight module; the lamp clamping portion has a pair of elastic clamping plates for engaging with an outer periphery of the end of the lamp; and the elastic conductive plate is electrically connected to a terminal of the end of the lamp. The manufacture cost of the lamp installation device of the present invention is relatively low, and the installation thereof is simple.

The present invention is to provide a backlight module having the lamp installation device, wherein an inner surface of the backlight module comprises a plurality of lamps, and two ends of each of the lamps is clamped, positioned and electrically connected by a lamp installation device, respectively. The manufacture cost of the backlight module having the lamp installation device of the present invention is relatively low, and the installation thereof is simple, so that the lamp can provide a better impact resistance.

To achieve the above object, the present invention provides a lamp installation device, applied to an end of a lamp in a backlight module of a liquid crystal display (LCD), wherein the lamp installation device comprises: a mounting end for mounting the lamp installation device on the backlight module; a lamp clamping portion having a pair of elastic clamping plates for engaging with an outer periphery of the end of the lamp; and an elastic conductive plate engaging against the end of the lamp and electrically connected to a terminal of the end of the lamp.

In one embodiment of the present invention, the mounting end, the lamp clamping portion and the elastic conductive plate are one-piece bent metal plate.

In one embodiment of the present invention, a bottom of the mounting end comprises an engaging clamp.

In one embodiment of the present invention, an opening of the engaging clamp faces toward one side close to the elastic conductive plate.

In one embodiment of the present invention, the engaging clamp of the bottom of the mounting end clamps an electrical connection plate or a printed circuit board in the backlight module.

In one embodiment of the present invention, the elastic clamping plates are a pair of curved elastic plates symmetrically arranged with each other, and the shape thereof is corresponding to the outer periphery of the lamp.

In one embodiment of the present invention, an upper end of each of the curved elastic plates further comprises a guiding plate, and an opening formed by the guiding plates is greater than an opening formed by the upper end of the curved elastic plates.

In one embodiment of the present invention, an upper end of the elastic conductive plate further comprises a notch, and the notch is corresponding to an outer periphery of the terminal of the lamp.

In one embodiment of the present invention, the elastic conductive plate has a lower vertical section, an upper vertical section and an elastic deformation section connected therebetween.

In one embodiment of the present invention, the elastic deformation section is U-shape.

To achieve the above object, the present invention provides a backlight module having a lamp installation device, wherein the backlight module comprises: a plurality of lamps, each of which has two ends; a plurality of lamp installation devices for clamping, positioning and electrically connecting to the ends of the lamps, respectively, wherein each of the lamp installation device comprises: a mounting end for mounting the lamp installation device on the backlight module; a lamp clamping portion having a pair of elastic clamping plates for engaging with an outer periphery of the end of the lamp; and an elastic conductive plate engaging against the end of the lamp and electrically connected to a terminal of the end of the lamp.

In one embodiment of the present invention, each of the lamp installation devices is mounted in a protection housing.

DETAILED DESCRIPTION OF THE PREFERRED EMBODIMENTS

Figure 1:
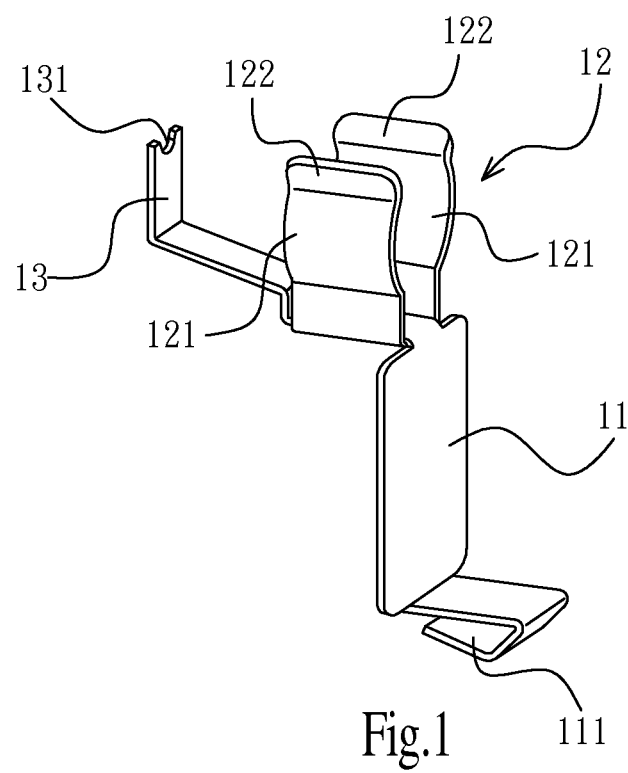
FIG. 1 is a perspective view of a lamp installation device according to a first embodiment of the present invention.

The structure and the technical means adopted by the present invention to achieve the above and other objects can be best understood by referring to the following detailed description of the preferred embodiments and the accompanying drawings, wherein Referring now to FIG. 1, a perspective view of a lamp installation device according to a first embodiment of the present invention is illustrated, wherein a lamp installation device 10 of the present invention is applied to the field of backlight modules of liquid crystal displays (LCDs), and the lamp installation device 10 comprises a mounting end 11, a lamp clamping portion 12 and an elastic conductive plate 13. The mounting end 11, the lamp clamping portion 12 and the elastic conductive plate 13 are preferably one-piece bent metal plate, such as a metal plate which is firstly cut by punching and then processed by bending.

Figure 2:
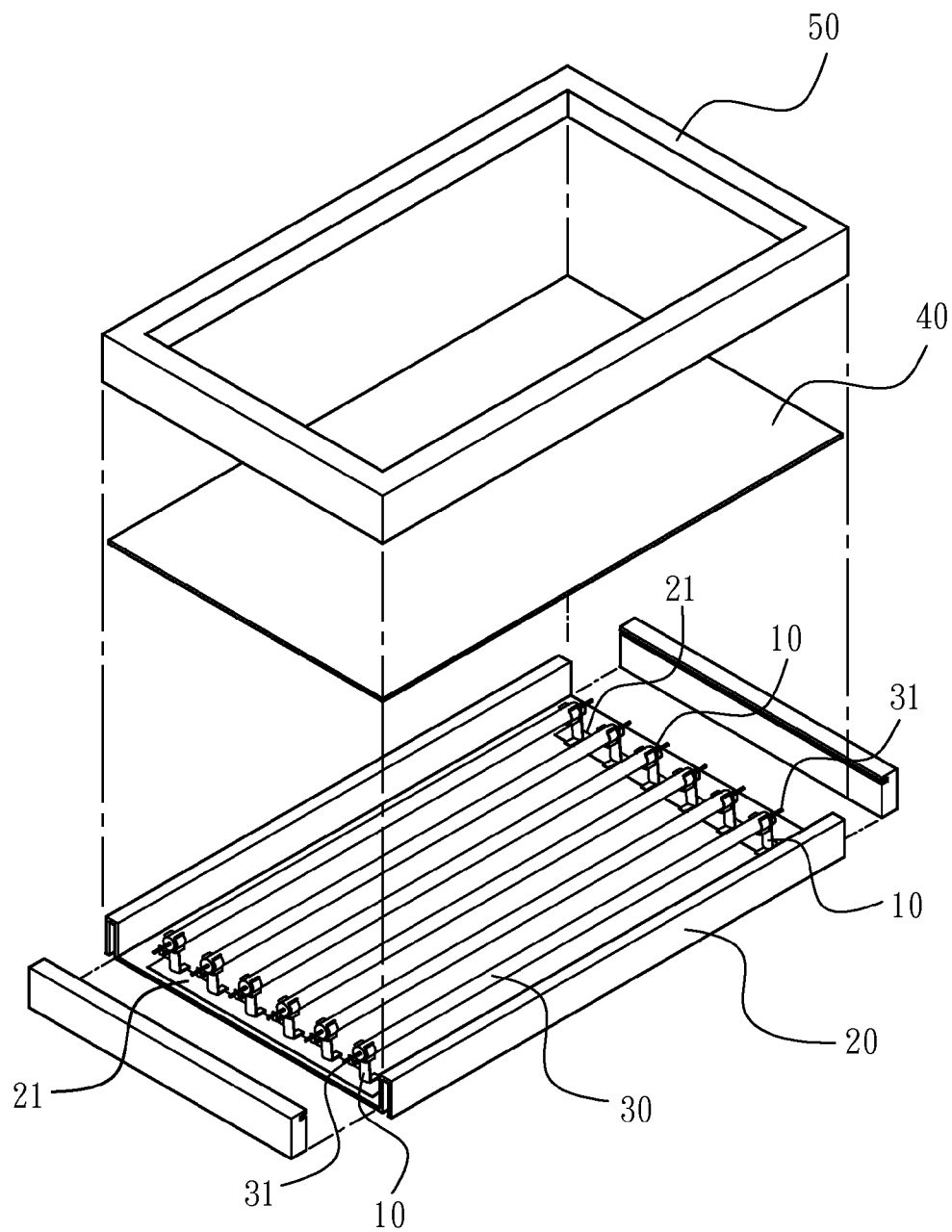
FIG. 2 is an exploded perspective view of a backlight module having the lamp installation device according to the first embodiment of the present invention.

Referring to FIG. 2, an exploded perspective view of a backlight module having the lamp installation device according to the first embodiment of the present invention is illustrated, wherein a backlight module 20 comprises a plurality of lamps 30 therein, an optical film assembly 40 thereon and an upper backlight lid 50, all of which construct a backlight module 20. Furthermore, two ends of each of the lamps 30 have a projected lamp terminal 31, respectively. The two ends of each of the lamps 30 are clamped, positioned and electrically connected to the lamp installation device 10, respectively, wherein the mounting end 11 is used to mount the lamp installation device 10 in the backlight module 20; the lamp clamping portion 12 has a pair of elastic clamping plates 121 for engaging with an outer periphery of one end of the lamp 30; and the elastic conductive plate 13 can engage against the end of the lamp 30 and electrically connected to the terminal 31 of the end of the lamp 30.

Figure 3:
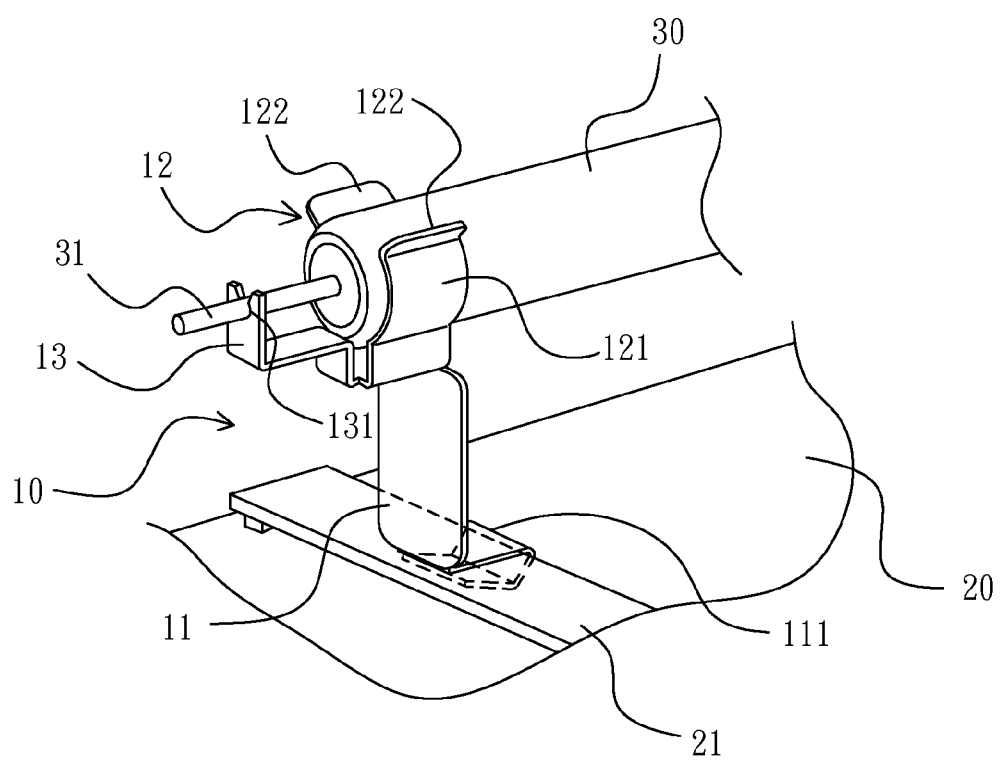
FIG. 3 is an assembled perspective view of the lamp installation device according to the first embodiment of the present invention.

Referring to FIG. 3, an assembled perspective view of the lamp installation device according to the first embodiment of the present invention is illustrated, wherein a bottom of the mounting end 11 of the lamp installation device 10 preferably comprises an engaging clamp 111, and an opening of the engaging clamp 111 preferably faces toward one side close to the elastic conductive plate 13, i.e. faces toward the outside of the backlight module 20. The engaging clamp 111 of the bottom of the mounting end 11 clamps an electrical connection plate (or a printed circuit board) 21 in the backlight module 20, so that the lamp installation device 10 can be mounted, and electrically connected to and supplied by an external power.

Although the lamp installation device 10 disclosed by the first embodiment of the present invention is mounted by clamping an electrical connection plate (or a printed circuit board) 21 in the backlight module 20, but the present invention is not limited thereto. The lamp installation device 10 can be mounted in the backlight module 20 by other engaging or locking means, and electrically connected by other means.

Referring to FIGS. 1 and 3, the elastic clamping plates 121 of the lamp clamping portion 12 are a pair of curved elastic plates 121 symmetrically arranged with each other, and the shape thereof is corresponding to the outer periphery of the lamp 30. An upper end of each of the curved elastic plates 121 further comprises a guiding plate 122, and an opening formed by the guiding plates 122 is greater than an opening formed by the upper end of the curved elastic plates 121, so as to guide the lamp 30 to be installed therein from an upper side. Moreover, the elastic conductive plate 13 preferably has a lower vertical section, an upper vertical section and an elastic deformation section connected therebetween (unlabeled), wherein the elastic deformation section can be an inclined portion. An upper end of the elastic conductive plate 13 further comprises a notch 131, and the notch 131 is corresponding to an outer periphery of the terminal 31 of the lamp 30. Preferably, the elastic deformation section of the elastic conductive plate 13 is slightly upturned, so that the height of the notch 131 is slightly higher than a predetermined installation height of the terminal 31 of the lamp 30 after installation.

Referring to FIG. 3, in installation, the end of the lamp 30 is firstly installed into the lamp installation device 10 from top to bottom, and the outer periphery of the lamp 30 can be guided by the guiding plates 122 of the upper end of the pair of the elastic clamping plates 121 and engaged into the pair of the elastic clamping plates 121 of the lamp clamping portion 12. Furthermore, the terminal 31 of the lamp 30 can be engaged in the notch 131 of the elastic conductive plate 13, and the terminal 31 of the lamp 30 slightly presses the upper vertical section of the elastic conductive plate 13 downward, so as to cause the downward deformation of the elastic deformation section. As a result, a stable contact of electrical connection is formed by providing an upward elastic bias to abut against the terminal 31.

In addition, referring to FIGS. 2 and 3, the two ends of the lamp 30 are installed on the elastic clamping plates 121 of the lamp installation device 10, and the terminal 31 of the lamp 30 is engaged with the elastic conductive plate 13, so as to form a stably engaging and clamping relationship.

As described above, the lamp installation device 10 is formed by a one-piece bent metal plate, so that the manufacture cost thereof is relatively low. The positioning and electrically connection of the lamp 30 can be simultaneously carried out by one-step, so that the installation is simple and reliable. The metal elasticity and structure of the lamp installation device 10 can buffer the external vibration to prevent from damaging the lamp 30, so that a better impact resistance can be provided.

Figure 4:
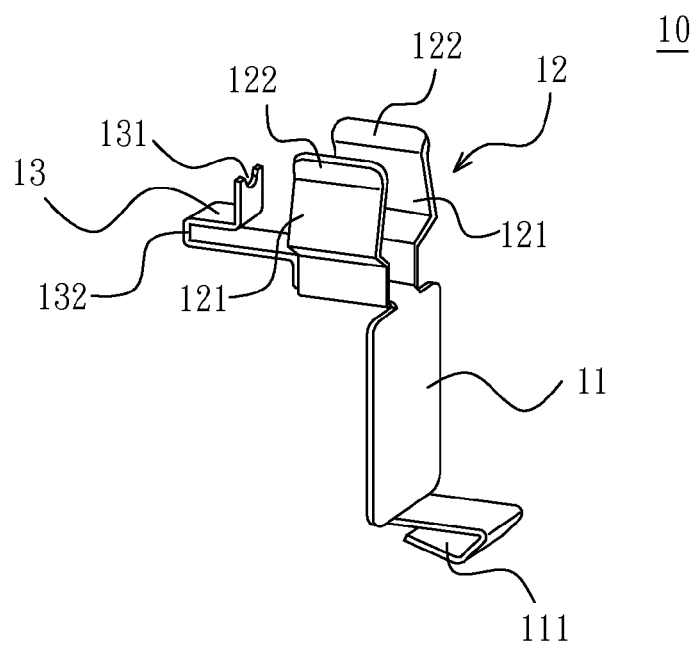
FIG. 4 is a perspective view of a lamp installation device according to a second embodiment of the present invention.

Referring now to FIG. 4, a perspective view of a lamp installation device according to a second embodiment of the present invention is illustrated, wherein the lamp installation device 10 of the second embodiment of the present invention is similar to the lamp installation device 10 of the first embodiment of the present invention, so as to use similar numerals and terms. But, the difference of the second embodiment is characterized in that the elastic conductive plate 13 further comprises a U-shape elastic deformation section 132, wherein the U-shape elastic deformation section 132 is preferably formed between the lower vertical section and the upper vertical section. Thus, when the terminal 31 of the lamp 30 is engaged in the notch 131 of the elastic conductive plate 13, a better upward elastic bias can be obtained, in order to enhance the quality of electrical connection with the terminal 31.

Moreover, the lamp clamping portion 12 of the lamp installation device 10 of the second embodiment of the present invention has the pair of the elastic clamping plates 121, wherein the profile of the elastic clamping plates 121 is not the same as the curved shape of the outer periphery of the lamp 30, but is two V-shape plates having angles. Similarly, it not only can carry out the purpose of clamping and positioning the lamp 30, but also the manufacture thereof is simpler.

Figure 5:
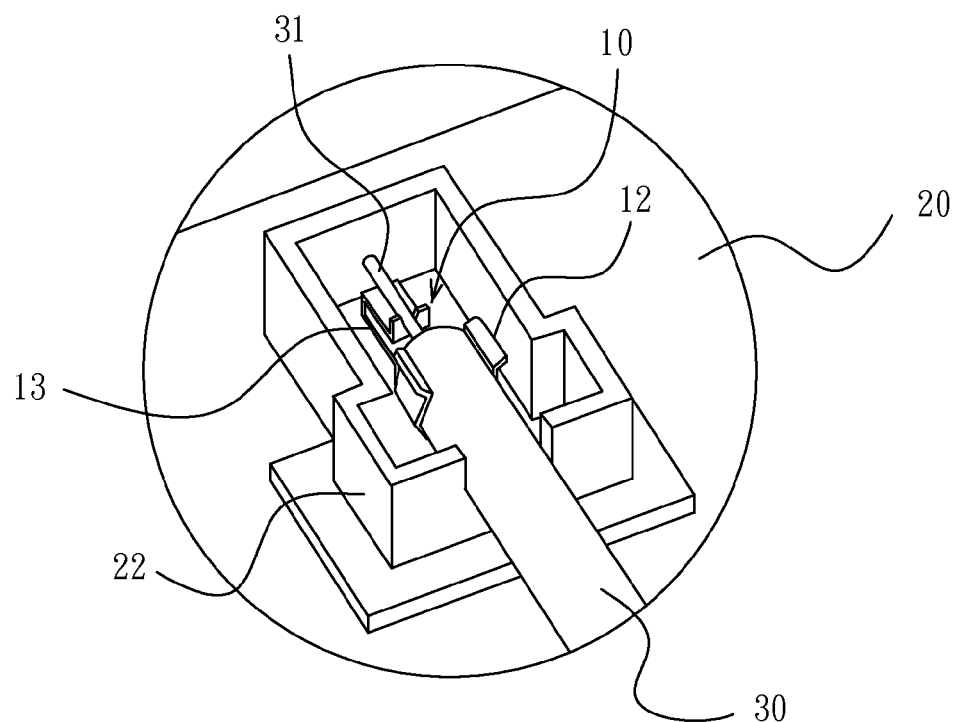
FIG. 5 is an assembled perspective of a lamp installation device according to a third embodiment of the present invention.

Referring now to FIG. 5, an assembled perspective view of a lamp installation device according to a third embodiment of the present invention is illustrated, wherein the lamp installation device 10 of the third embodiment of the present invention is similar to the lamp installation device 10 of the first and second embodiments of the present invention, so as to use similar numerals and terms. But, the difference of the third embodiment is characterized in that the lamp installation device 10 is mounted in a protection housing 22, wherein the protection housing 22 is slightly greater than the lamp installation device 10, and has an opening on an upper surface and a notch on one side close to the lamp 30, so that it is convenient to install the lamp 30 and provide the protection function for the entire lamp installation device 10 and the terminal 31, in order to prevent other elements from being accidently in contact with the lamp installation device 10 and the terminal 31 to affect the stability and light emitting function of the lamp 30. Moreover, the notch of the protection housing 22 also can provide an auxiliary function of supporting the lamp 30.

As described above, in comparison with the traditional lamp clamping and conducting device which has disadvantages including complicated installation steps, low impact resistance, complicated and too many components and too high cost, the backlight module and the lamp installation device of the present invention has advantages including relatively low manufacture cost, simple installation and better impact resistance of the lamp.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module,
comprising:
a plurality of lamps, each of which has two ends;
a plurality of lamp installation devices for clamping, positioning and electrically connecting to the ends of the lamps, respectively, wherein each of the lamp installation device comprises:
a mounting end for mounting the lamp installation device on the backlight module; and
a lamp clamping portion having:
a pair of elastic clamping plates for engaging with the end of the lamp; and
an elastic conductive plate engaging against the end of the lamp and electrically connected to a terminal of the end of the lamp;
wherein an upper end of the elastic conductive plate further comprises a notch, and the notch is corresponding to an outer periphery of the terminal of the lamp;
wherein the elastic conductive plate has a lower vertical section, an upper vertical section and an elastic deformation section connected therebetween; and
wherein the elastic deformation section is an inclined portion; and
before installation of the lamp, the elastic deformation section is slightly upturned so that the height of the notch is slightly higher than a predetermined installation height of the terminal of the lamp after the installation.

2. A backlight module,
comprising:
a plurality of lamps, each of which has two ends;
a plurality of lamp installation devices for clamping, positioning and electrically connecting to the ends of the lamps, respectively, wherein each of the lamp installation device comprises:
a mounting end for mounting the lamp installation device on the backlight module;
a lamp clamping portion having a pair of elastic clamping plates for engaging with the end of the lamp; and
an elastic conductive plate engaging against the end of the lamp and electrically connected to a terminal of the end of the lamp;
wherein an upper end of the elastic conductive plate further comprises a notch, and the notch corresponds to an outer periphery of the terminal of the lamp,
the elastic conductive plate has a lower vertical section, an upper vertical section and a horizontal U-shape elastic deformation section connected therebetween, and
a height of the notch before installation of the lamp is slightly higher than a predetermined installation height of the terminal of the lamp after the installation.

3. The backlight module according to claim 2, characterized in that:
the mounting end, the lamp clamping portion and the elastic conductive plate are one-piece bent metal plate.

4. The backlight module according to claim 2, characterized in that:

a bottom of the mounting end comprises an engaging clamp.

5. The backlight module according to claim 4, characterized in that:
an opening of the engaging clamp faces toward one side close to the elastic conductive plate.

6. The backlight module according to claim 4, characterized in that:
the engaging clamp of the bottom of the mounting end clamps an electrical connection plate or a printed circuit board in the backlight module.

7. The backlight module according to claim 2, characterized in that:
the elastic clamping plates are a pair of curved elastic plates symmetrically arranged with each other, and the shape thereof is corresponding to an outer periphery of the lamp.

8. The backlight module according to claim 7, characterized in that:
an upper end of each of the curved elastic plates further comprises a guiding plate, and an opening formed by the guiding plates is greater than an opening formed by the upper end of the curved elastic plates.

9. The backlight module according to claim 2, characterized in that:
each of the lamp installation devices is mounted in a protection housing.

10. A lamp installation device, comprising:
a mounting end for mounting the lamp installation device on a backlight module;
a lamp clamping portion having a pair of elastic clamping plates for engaging with one end of a lamp of the backlight module; and
an elastic conductive plate engaging against the end of the lamp and electrically connected to a terminal of the end of the lamp,
wherein an upper end of the elastic conductive plate further comprises a notch, and the notch corresponds to an outer periphery of the terminal of the lamp,
the elastic conductive plate has a lower vertical section, an upper vertical section and a horizontal U-shape elastic deformation section connected therebetween, and
a height of the notch before installation of the lamp is slightly higher than a predetermined installation height of the terminal of the lamp after the installation.

11. The lamp installation device according to claim 10, characterized in that:
the mounting end, the lamp clamping portion and the elastic conductive plate are one-piece bent metal plate.

12. The lamp installation device according to claim 10, characterized in that:
a bottom of the mounting end comprises an engaging clamp.

13. The lamp installation device according to claim 12, characterized in that:
an opening of the engaging clamp faces toward one side close to the elastic conductive plate.

14. The lamp installation device according to claim 10, characterized in that:
the elastic clamping plates are a pair of curved elastic plates symmetrically arranged with each other, and the shape thereof is corresponding to an outer periphery of the lamp.

15. The lamp installation device according to claim 14, characterized in that:
an upper end of each of the curved elastic plates further comprises a guiding plate, and an opening formed by the guiding plates is greater than an opening formed by the upper end of the curved elastic plates.

* * * * *